Nov. 25, 1958   D. S. STEVENS   2,861,790
WEIGHING DEVICE
Filed Feb. 27, 1956
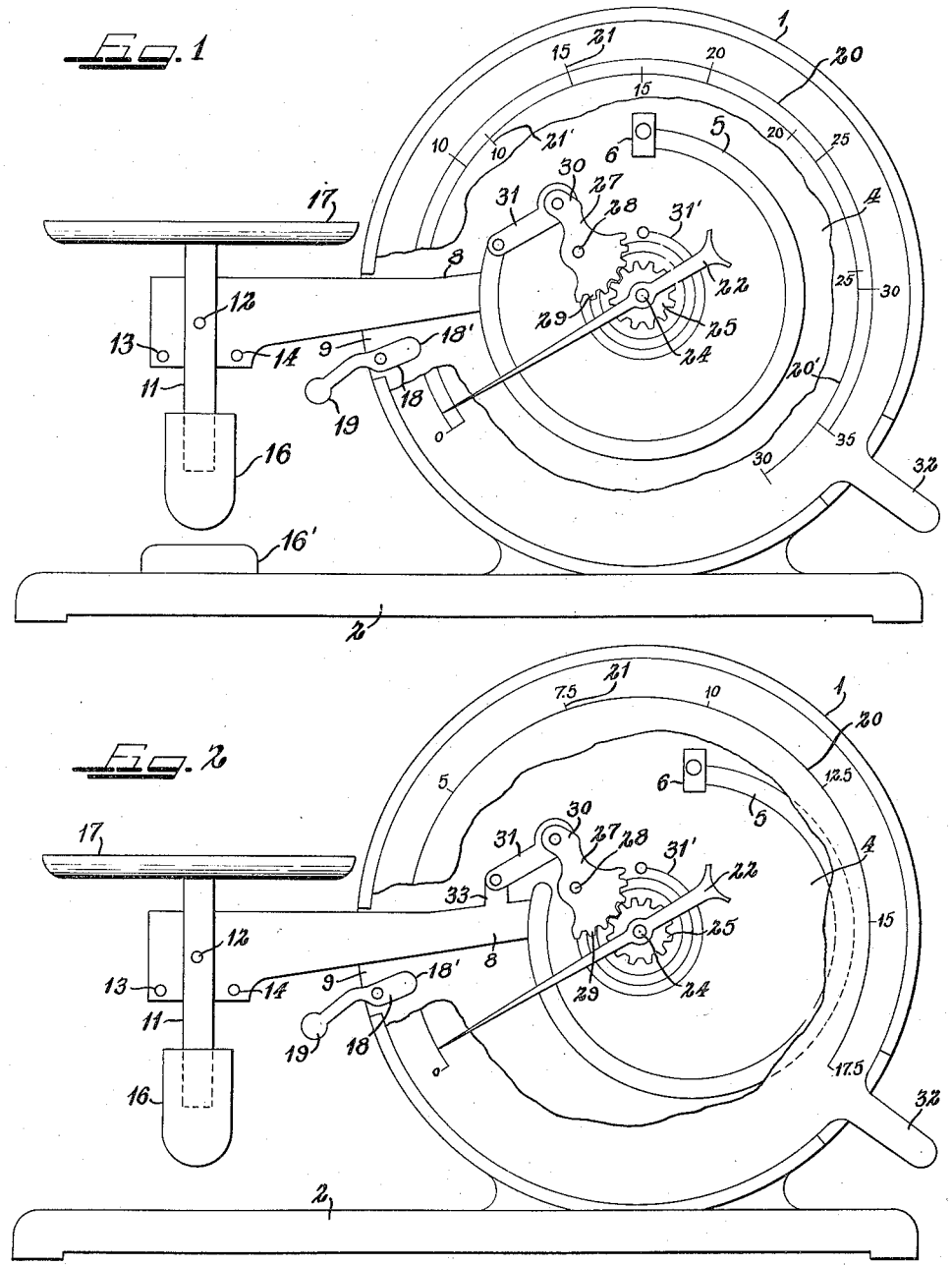
Inventor
Daniel S. Stevens
By Morris Spector
Atty.

United States Patent Office 2,861,790
Patented Nov. 25, 1958

2,861,790

WEIGHING DEVICE

Daniel S. Stevens, Chicago, Ill.

Application February 27, 1956, Serial No. 567,960

8 Claims. (Cl. 265—68)

This application is a continuation-in-part of my copending application Serial No. 336,226, filed February 11, 1953, now abandoned, and which related to a weighing device.

This invention relates to a weighing device, particularly to a device for weighing light objects.

One of the objects of this invention is to provide a simple and reliable instrument for the fast weighing of small objects. Another one of the objects of this invention is to provide a weighing device of this type wherein the weigh pan and support thereof are so constructed and arranged that the device will register the same weight regardless of the position of the object to be weighed on the weigh pan. Still another one of the objects of this invention is to provide a weighing device having an improved sensitivity over prior weighing devices of a similar type, particularly through use of a magnetic force providing means which increases the apparent weight of the object being weighed.

It is still another one of the objects of this invention to provide a highly sensitive weighing device for weighing light objects, one which is exceedingly simple and economical in construction relative to prior weighing devices of comparable sensitivity, and which although similar to the embodiment disclosed in said application Serial No. 336,226, has a substantially greater sensitivity, without increasing the number or complexity of the parts making up the weighing device.

It is an all inclusive object of this invention to provide a weighing device as just described which is reliable in operation, and which is constructed of parts which are unlikely to break or be deformed during prolonged periods of use.

Other objects and advantages of the invention will become apparent upon making reference to the specification to follow taken in conjunction with the drawings showing a preferred embodiment of the invention.

In the drawings:

Fig. 1 is a front view of one embodiment of the invention, with the scale broken away to show internal mechanism; and Fig. 2 is a front view of a modified form of the invention having a substantially greater sensitivity than the embodiment of Fig. 1, with the scale broken away to shown internal mechanism.

Referring to Fig. 1, the weighing device shown therein includes a circular housing 1 mounted upon a base 2. The housing includes a support wall or frame 4 which supports the various mechanism contained in the housing. This mechanism includes a weigh spring member 5 in the form of a curved hollow tube, constructed as a conventional Bourdon tube. One end of the tube is soldered to a block 6 which is fastened to the support wall or frame 4 of the housing 1 directly above the center of the circular housing 1. The tube curves down around the center of the housing following a circle which is concentric with the housing center, and terminates in a free end located to the left of and a short distance above the housing center and well below the fixed end of the tube. The free end of the Bourdon tube is connected with a generally horizontally extending arm 8 which projects through an opening 9 in the side wall of the housing 1.

The outer end of the arm 8 carries a vertical member 11 which is pivotally supported between its ends upon a horizontal pivot pin 12 carried by the arm 8. Sufficient clearance is provided between the vertical member 11 and the arm 8 that it may freely pivot upon the arm within the limits permitted by stop pins 13 and 14 extending horizontally from the arm 8 on opposite sides of the vertical member 11 in the path of pivotal movement of the latter.

The lower end of the vertical member 11 carries a counterweight 16 which may be a permanent magnet. An iron block 16' is carried upon the base 2 below the counterweight 16. The upper end of the vertical member 11 carries a weigh pan 17 which receives the small objects to be weighed. Although the arrangement of the weigh pan 17, member 11, and counterweight 16 is preferred, other means for pivotally supporting the weigh pan may be used.

The downward deflection of the arm 8 is limited by a stop member 18 rotatably mounted upon the housing wall 4. A handle 19 attached to the stop member extends through the housing opening 9 and when depressed from the position shown in the drawing raises a stop extension 18' which forces the arm 8 against the upper defining wall of the housing opening 9 to immobilize the arm 8 and the rest of the mechanism when the weighing device is carried about.

The housing 1 includes two sets of scales 20—20' with index markings 21—21' thereon arranged concentrically about the center of the housing. A visible indicating needle 22 on the outer side of the scale 20 is rotatably mounted upon a shaft 24 for movement about the housing center. The shaft 24 also carries a needle driving member 25 which consists of a pinion gear which meshes with a gear sector piece 27 which is pivotally mounted upon the housing wall 4 upon a pivot pin 28. The gear sector piece has a number of teeth 29 which fall about a circle concentric with the pivot pin 28, and an extension 30 on the opposite side of the pivot pin 28 from the gear teeth 29. A link member 31 is pivotally secured at one end to the gear sector extension 30 and the other end thereof is pivotally connected to the end of the Bourdon tube 5.

The pinion gear 25 and the gear teeth of the gear sector piece 27 are maintained in engagement by a coil spring 31' which urges the needle in a counter-clockwise direction as viewed in Fig. 1. The spring in anchored at one end to the housing wall 4 and is fastened at the other end to the shaft 24.

The position of the pointer 22 is, of course, determined by the angular position of the arm 8 secured to the free end of the Bourdon tube 5. To insure correspondence between the end of the pointer 22 and the zero mark on the scale 20 when the weigh pan is empty, an extension 32 is provided on the scale 20 which extension passes through an opening in the side walls of the housing to provide a handle for rotating the scale about the axis of the needle shaft 24.

The operation of the weigh scale device is as follows: When a light object having a weight falling within the useful range thereof is placed on the weigh pan 17, say, to one side of the center thereof, the vertical member 11 will tilt only slightly without touching the stop pins 13 and 14 due to the stablizing couple provided by the counterweight 16. Also, due to the counterweight, the couple produced by the object in the weigh pan will appear to act upon the arm 8 along a line passing through the center of the horizontal pivot pin 12. The weight of the object and the magnetic pull between the magnetic counterweight and the iron block 16' is imparted to arm 8 and the pull on the arm bends the Bourdon tube. The Bourdon tube acts as a spring which has sufficient rigidity that small deflections will be transmitted to the needle practically instantaneously to give a rapid reading. Such downward deflection of the arm 8 will result in the counter-clockwise turning of the gear sector piece 27 as the link piece 31 pulls down upon the extension 30 of the gear sector piece. The helical spring 31' maintains contact between the pinion gear and the teeth of the gear sector piece during this movement of the latter so that any movement of the gear sector piece is transmitted to the pinion gear 25. Counterclockwise movement of the gear sector piece results in clockwise movement of the pinion gear which rotates the indicating needle 22 in the same direction. The friction offered by the gear teeth is so small compared to the forces acting upon the Bourdon tube that variation in frictional forces in the mechanism do not cause significant variations in the needle readings.

The device described is especially adapted for pre-weighing operations of an analytical balance. Rapid and reliable readings are obtained for weights which are a fraction of a gram.

Although a Bourdon tube is preferred, it is contemplated as a part of the broader aspect of the invention to utilize a solid spring member in place of the Bourdon tube.

The use of a magnet for counterweight 16 increases the weight sensitivity of the device. When objects of increasing weight are placed in the weigh pan 17, the distance between the magnet and the iron block 16' decreases progressively. The magnetic force acting on the arm 8 increases the displacement of the indicating needle relative to a weighing device which does not utilize a magnetic pull.

When the counterweight 16 is a magnetic member and the iron block 16' is used in conjunction therewith, the inner scale 20' of the dial is utilized. It will be noted that the index marks on the inner scale 20' are displaced ahead of the corresponding index marks on the outer scale 20. Also, the inner scale 20' is non-linear while the outer scale 20 is linear. The outer scale 20 would be utilized where the counterweight 16 is a non-magnetic member.

Reference should now be made to the embodiment of Fig. 2 which is similar in many respects to the embodiment of Fig. 1 except that the iron block 16' has been removed, and the counterweight is a non-magnetic member. The elements in the embodiment of Fig. 2 which correspond to the elements in the embodiment of Fig. 1 have been similarly numbered. The other difference between the embodiment of Fig. 2 and the embodiment of Fig. 1 is that in Fig. 2 the Bourdon tube 5 has been moved to the right so that the anchor block 6 securing the right hand end of the Bourdon tube is located to the right of a vertical line passing through the center of the housing. Also, the link piece 31 instead of being connected directly to the free end of the Bourdon tube is pivotally connected to an extension 33 of the arm 8 at a point spaced from the free end of the Bourdon tube in a direction away from the anchored end thereof. This results in a significant multiplication or magnification of the movement imparted to the gear sector 27, the pinion gear 25 and the needle 22 for a given weight, relative to the device of Fig. 1. In the embodiment of Fig. 2, since the magnetic force between the counterweight 16 and the base 2 is lacking entirely, the outer scale 20 is utilized in reading the weight of the object being measured on the weighing device.

It should be understood that numerous other modifications may be made of the preferred embodiment of the invention above described without deviating from the broader aspects of the invention.

I claim:

1. A weighing device having in combination a housing, a dial supported on said housing, an indicating needle rotatably mounted on said housing adjacent to the dial, a Bourdon tube having one end fixed to the housing with the other end free, an arm having one end connected to the free end of the Bourdon tube and transmitting a force thereto in a direction substantially in the plane of the central longitudinal axis of the tube, a weigh pan supported upon the other end of said arm, and mechanism for connecting the free end of the Bourdon tube to the indicating needle, said mechanism comprising a link member, a pivoted sector, and a needle driving member rotatably mounted, the link member having one end pivotally attached to the free end of the Bourdon tube and the other end pivotally attached to the sector, the sector being in driving coupled relationship with the driving member which is mounted to drive the indicating needle, and resilient means urging the driving member and the sector together.

2. A weighing device having in combination a housing, a dial supported on said housing, an indicating needle rotatably mounted adjacent to the dial, a Bourdon tube having one end connected to the housing with the other end free, transmission mechanism for connecting the free end of the Bourdon tube to said indicating needle comprising a link member, a pivotally mounted gear sector, a pinion connected in driving relation with the indicating needle, the link member having one end pivotally attached to the free end of the Bourdon tube and the other end pivotally attached to said sector, the sector meshing with the pinion gear, and resilient means urging said pinion and gear sector together, a horizontally extending arm secured to the free end of the Bourdon tube, the opposite end of said arm supporting a vertical member on a generally horizontal pivot axis, a weigh pan fastened to said vertical member above the pivot axis for receiving objects to be weighed, a counterweight secured to said vertical member beneath said pivot axis, and said housing supporting a member below said counterweight, said counterweight and said member supported by said housing having magnetic attracting properties so that the counterweight is attracted toward said house supported member.

3. A weighing device having in combination a housing, a movably mounted indicating member on the housing, a Bourdon tube having one end connected to the housing with the other end free, transmission mechanism connected between the free end of the Bourdon tube and said indicating member to transmit movement of the free end of the Bourdon tube to the indicating member, and support means for supporting the object to be weighed connected to the free end of the Bourdon tube to move the latter in a direction substantially in the plane of the central longitudinal axis of the tube and an amount which is a function of the weight of the object supported upon said support means.

4. A weighing device having in combination a housing, a movably mounted indicating member supported on said housing, a Bourdon tube having one end connected to said housing with the other end free, transmission mechanism interconnecting the free end of the Bourdon tube and said indicating member for moving the latter an amount which is a function of the amount of movement imparted to the free end of the Bourdon tube, an arm carried by the free end of the Bourdon tube, a support member pivotally supported intermediate its end to said arm about a generally horizontal axis, a counterweight carried by said support member below the pivot axis thereof, said support member above said axis having means for receiving the object to be weighed, a member fixed to said housing below said counterweight, said counterweight and said last-mentioned member having mutually magnetic attracting properties whereby the counterweight is attracted to said latter member.

5. A weighing device comprising a frame, a dial supported on said frame, an indicating needle rotatably mounted upon said frame adjacent to the dial, a curved resilient Bourdon tube member having one end anchored to said frame and the other end free, an arm secured at one end to the free end of the resilient Bourdon tube member and extending away from the end of the Bourdon tube member in a direction making an appreciable angle to the vertical, means for receiving the object to be weighed, a support for said receiving means which support is pivotally mounted to the free end of said arm about a generally horizontal pivot axis, and transmission means for coupling the angular movement of said arm to said needle, said transmission means being connected to said arm at a point spaced from the free end of the resilient Bourdon tube member in a direction away from the anchored end thereof.

6. A weighing device comprising a frame, a dial supported on said frame, an indicating needle rotatably mounted upon said frame adjacent to the dial, a curved resilient Bourdon tube member having one end connected to said frame and the other end free, an arm secured at one end to the free end of the resilient Bourdon tube member and extending away from the end of the Bourdon tube member in a direction making an appreciable angle to the vertical, means for receiving the object to be weighed, a support for said receiving means, said support being pivotally mounted to the free end of said arm about a generally horizontal pivot axis below said means, and transmission mechanism connecting said arm with said indicating needle comprising a gear sector pivotally mounted to said frame and having gear teeth on one side of the pivot axis thereof and an extension on the other side of said pivot axis, a link member pivotally connected at one end to said pivot member extension and to the other end to said arm at a point spaced from the part of said arm which joins the free end of said resilient Bourdon tube member in a direction away from the anchored end thereof, to produce a magnification of the movement of the gear sector, and a pinion gear pivotally mounted upon said frame and connected to said gear sector teeth which imparts rotation to same, and said pinion gear being in driving relation with said indicating needle.

7. A weighing device having in combination, a housing, a dial supported on said housing, an indicating needle rotatably mounted adjacent to the dial, a Bourdon tube having one end connected to the housing with the other end free, transmission mechanism for connecting the free end of the Bourdon tube to said indicating needle comprising a link member, a pivotally mounted sector, a pinion connected in driving relation with the indicating needle, the link member having one end pivotally attached to the free end of the Bourdon tube and the other end pivotally attached to said sector, the sector being coupled with the pinion, and resilient means urging said pinion and sector together, a horizontally extending arm secured to the free end of the Bourdon tube, the opposite end of said arm supporting a vertical member on a generally horizontal pivotal axis, a weigh pan fastened to said vertical member for receiving objects to be weighed.

8. A weighing device having in combination, a housing, a movably mounted indicating member supported on said housing, a Bourdon tube having one end connected to said housing with the other end free, transmission mechanism interconnecting the free end of the Bourdon tube and said indicating member for moving the latter an amount which is a function of the amount of movement imparted to the free end of the Bourdon tube, an arm carried by the free end of the Bourdon tube, a support member pivotally supported intermediate its end to said arm about a generally horizontal axis, a counterweight carried by said support member below the pivot axis thereof, said support member above said axis having means for receiving the object to be weighed.

References Cited in the file of this patent

UNITED STATES PATENTS

| 259,338 | Smith et al. | June 13, 1882 |
| 499,479 | Stocker | June 13, 1893 |
| 1,724,993 | Coker | Aug. 20, 1929 |
| 2,373,504 | Schlieben et al. | Apr. 10, 1945 |
| 2,475,684 | Weckerly | July 12, 1949 |